United States Patent
Brown et al.

(10) Patent No.: US 8,843,740 B2
(45) Date of Patent: Sep. 23, 2014

(54) DERIVED CERTIFICATE BASED ON CHANGING IDENTITY

(75) Inventors: Michael Stephen Brown, Kitchener (CA); David Francis Tapuska, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 21 days.

(21) Appl. No.: 13/310,356

(22) Filed: Dec. 2, 2011

(65) Prior Publication Data

US 2013/0145151 A1   Jun. 6, 2013

(51) Int. Cl.
*H04L 29/06* (2006.01)
*H04L 9/32* (2006.01)

(52) U.S. Cl.
USPC .......................................... 713/156; 713/175

(58) Field of Classification Search
USPC ......................................................... 713/175
See application file for complete search history.

(56) References Cited

U.S. PATENT DOCUMENTS

| | | | |
|---|---|---|---|
| 7,275,102 B2 | 9/2007 | Yeager et al. | |
| 7,512,974 B2 | 3/2009 | Callaghan et al. | |
| 2003/0163700 A1 | 8/2003 | Paatero | |
| 2005/0005097 A1* | 1/2005 | Murakawa | 713/156 |
| 2006/0195689 A1* | 8/2006 | Blecken et al. | 713/156 |
| 2007/0147619 A1 | 6/2007 | Bellows et al. | |
| 2008/0104401 A1* | 5/2008 | Miyamoto et al. | 713/175 |
| 2011/0087883 A1* | 4/2011 | Campagna et al. | 713/156 |
| 2012/0036364 A1* | 2/2012 | Yoneda et al. | 713/175 |

FOREIGN PATENT DOCUMENTS

| | | |
|---|---|---|
| EP | 1271875 | 1/2003 |
| WO | 0131836 | 5/2001 |
| WO | 2005/053266 | 6/2005 |
| WO | 20081051700 | 5/2008 |

OTHER PUBLICATIONS

Hayes, J.M., "Secure in-band update of trusted certificates," Enabling Technologies: Infrastructure for Collaborative Enterprises, 1999. (WET ICE '99) Proceedings. IEEE 8th International Workshops on , vol., No., pp. 168,173, 1999.*

Jipeng Zhou; Zhengjun Lu, "A Secure Distributed Location Service Scheme for Mobile Ad Hoc Networks," Computer Network and Multimedia Technology, 2009. CNMT 2009. International Symposium on , vol., No., pp. 1,4, Jan. 18-20, 2009.*

(Continued)

*Primary Examiner* — Luu Pham
*Assistant Examiner* — Vu V Tran
(74) *Attorney, Agent, or Firm* — Integral Intellectual Property Inc.; Miriam Paton

(57) ABSTRACT

A first device with a changing identity establishes a secure connection with a second device in a network by acting as its own certificate authority. The first device issues itself a self-signed root certificate that binds an identity of the first device to a long-term public key of the first device. The root certificate is digitally signed using a long-term private key, where the long-term public key and the long-term private key form a public/private key pair. The first device provides its root certificate to the second device in any trusted manner. The first device can then create a certificate for one or more short-term identities acquired by the first device and sign the newly-created certificate using the long-term private key. The first device can authenticate itself to the second device by sending the newly-created certificate to the second device.

16 Claims, 6 Drawing Sheets

(56) References Cited

OTHER PUBLICATIONS

Forne, Jordi et al., "Pervasive authentication and authorization infrastructures for mobile users", Computers & Security, 29: 501-514, 2010.

Lazaro, Marisa, Extended European Search Report for EP 11191834.8, Jun. 13, 2012.

Lazaro, Marisa, Extended European Search Report for EP 11195680.1, Jun. 13, 2012.

Engel, Lawrence J., First Office Action for CA2,795,420, Feb. 21, 2014.

* cited by examiner

DERIVED CERTIFICATE BASED ON CHANGING IDENTITY

TECHNICAL FIELD

The following relates to creating and using a derived certificate based on a changing identity.

BACKGROUND

A certificate authority may create for a server a certificate that binds an identity of the server to a public key of the server, where the certificate is digitally signed by the certificate authority. The server may authenticate itself to a client by presenting to the client the certificate issued by the certificate authority. The client, which is in possession of a root certificate of the certificate authority, may use the root certificate to validate the certificate received from the server.

As part of the certificate validation, the client may be required to compare an identity indicated in the received certificate to an identity of the server with which the client is communicating. If the identities are not identical, the received certificate cannot be validated and the server will not be authenticated to the client.

BRIEF DESCRIPTION OF THE DRAWINGS AND APPENDICES

Figure 1:
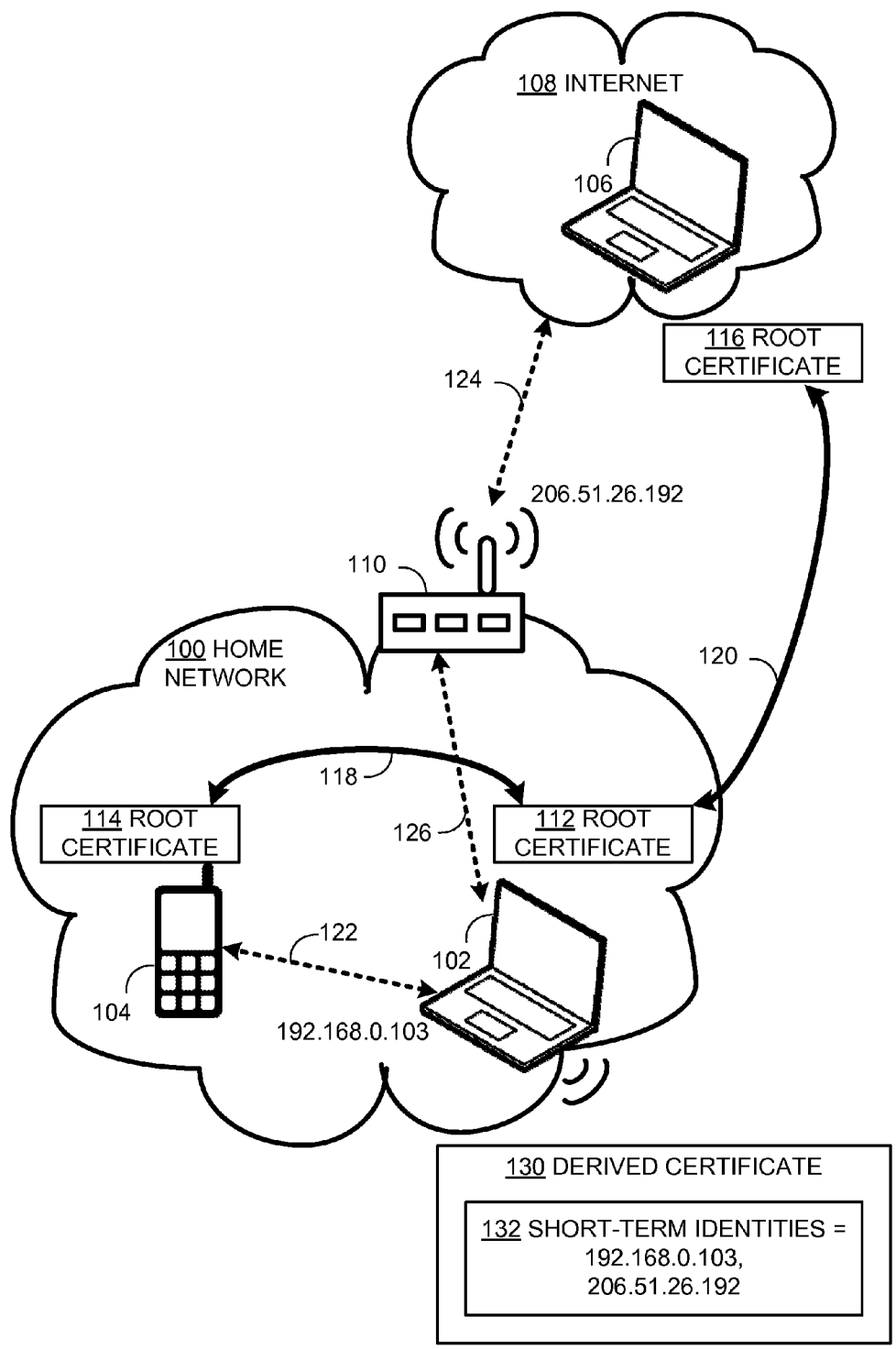
FIG. 1 is a schematic diagram illustrating a first device and a second device in a home network that is connected to a third device on the internet via a home router.

Appendix A is an example X.509 root certificate; and

Appendix B is an example X.509 derived certificate that is digitally signed by the example X.509 root certificate of Appendix A.

DETAILED DESCRIPTION

A first device may seek to establish a secure connection with a second device on a network. This may be achieved using a secure sockets layer (SSL) protocol or a variation thereof called the transport layer security (TLS) protocol. SSL and TLS are commonly-used cryptographic protocols for providing communication security over the Internet. In one example, a server is issued a certificate by an external trusted third party or certificate authority. The issued certificate binds an identity of the server to a public key of the server, where the issued certificate is digitally signed using a private key of the certificate authority. The private key of the certificate authority forms a public/private key pair with a public key of the certificate authority. A root certificate of the certificate authority binds an identity of the certificate authority to the public key. The root certificate is digitally signed using the private key of the certificate authority. The certificate authority may distribute its root certificate directly or indirectly to any clients that might seek to communicate with the server.

Once the server has received the certificate that it was issued by the certificate authority, the server may authenticate itself to a given client by presenting the issued certificate. The client, which is in possession of the root certificate of the certificate authority, may use the root certificate to validate the certificate received from the server.

A certificate is a data structure that consists of a number of fields. The certificates used for SSL/TLS protocols generally adhere to the specifications in the document "RFC 3280 Internet X.509 Public Key Infrastructure" by Housley et al. (April 2002), which will hereinafter be referred to as the "X.509 standard". An X.509 certificate comprises an indication of an identity of the entity to which the certificate was issued. This indication may be comprised in either in a subject field of the certificate, as described in Section 4.1.2.6 of the X.509 standard, or a subject alternative name extension of the certificate (also known as a "subjectAltName" extension), as described in Section 4.2.1.7 of the X.509 standard, or both. The identity of the entity may be indicated in multiple ways. For example, the identity may comprise one or more of a network address, a website address, an internet protocol (IP) address, a media access control (MAC) address, a Bluetooth® address, a personal identification number (PIN), and the like.

When validating an X.509 certificate, a client checks that the identity indicated in the subject field or in the "subjectAltName" extension of the certificate is identical to the identity of the entity from which the certificate was received. In one example, a client seeking to authenticate a website with the website address "www.example.com" checks that the X.509 certificate received from that website address indicates a common name (CN) of "www.example.com", in one or both of its subject field and its "subjectAltName" extension.

In contrast to a website, which may be identified by a long-term website address, a device may acquire different identities in the form of different network addresses, which may vary dynamically in response to changes in the network or changes in the device or both. For example, when a device roams onto a network, it may be dynamically assigned an IP address by a Dynamic Host Configuration Protocol (DHCP) server in the network. This IP address may differ from an IP address that was previously assigned to that device on a previous occasion when the device roamed to that same network. Thus, the device may acquire a short-term identity in the form of an IP address for each new IP address that it is dynamically assigned to the device by the DHCP server.

A first device with a changing identity may seek to establish a secure connection with a second device. However, in order for the first device to authenticate itself to the second device using an X.509 certificate, the first device provides an indication of its current identity in the subject field or in the subjectAltName extension of its certificate. Therefore, each time the first device's identity changes and the first device seeks to authenticate itself to the second device using an X.509 certificate, the first device must obtain a new certificate for its new identity. Traditionally, this is done by having the first device send a certificate request to a certificate authority. According to the X.509 standard, a certificate for the new identity of the first device may be created by having the certificate authority digitally sign the certificate request received from the first device. Once the certificate authority has created the certificate for the new identity of the first device, the certificate authority may provide the certificate to the first device, and the first device may send the certificate to the second device. It will be appreciated that requiring the first device to communicate with an external trusted third party or certificate authority each time the first device seeks to establish a secure connection with another device following an identity change may become very burdensome, especially when the identity of the first device changes often. The delay associated with sending a certificate request and waiting to receive a new certificate from the certificate authority may result in disruption of secure communications between the first device and the second device. Furthermore, in the case where there are numerous devices with changing identities and each device is making repeated certificate requests to the certificate authority, the certificate authority may become overloaded and the creation of certificates may be impeded.

In view of the changing identities of devices on a network, it is proposed in this document to have a certificate trust system that does not require the involvement of an external certificate authority or any other third party. To this end, it is proposed in this document that each device in a network may act as its own certificate authority. Specifically, a first device may issue to itself its own self-signed root certificate that binds an identity of the first device to a long-term public key of the first device, the root certificate digitally signed using a long-term private key of the first device, where the long-term public key and the long-term private key form a public/private key pair. The self-signed root certificate includes an indication that it may be used for verifying digital signatures of derived certificates. The first device may provide its root certificate to a second device in any trusted manner. Then, for a short-term identity acquired by the first device, the first device may create a derived certificate that binds the short-term identity to a short-term public key of the first device, the derived certificate digitally signed using the long-term private key of the first device. When the first device seeks to authenticate itself to the second device, for example, for the purpose of establishing a secure connection with the second device, the first device sends the derived certificate for its short-term identity to the second device. The second device uses the first device's trusted root certificate to verify a digital signature on the derived certificate. According the requirements of the X.509 standard, the second device also verifies that the short-term identity indicated in the derived certificate is identical to an identity of the device from which the derived certificate was received. If the identities are identical, the second device may authenticate the device from which the derived certificate was received as the first device.

Analogously, the second device may issue to itself its own self-signed root certificate that binds an identity of the second device to a long-term public key of the second device, the root certificate digitally signed using a long-term private key of the second device, where the long-term public key and the long-term private key form a public/private key pair. The second device may provide its root certificate to the first device in any trusted manner. Then, for a short-term identity acquired by the second device, the second device may create a certificate that binds the short-term identity to a short-term public key of the second device, the newly-created certificate digitally signed using the long-term private key of the second device, referred to in this document as the "derived certificate". When the second device seeks to authenticate itself to the first device, the second device sends the derived certificate for its short-term identity to the first device. The first device uses the second device's trusted root certificate to verify a digital signature on the derived certificate. In accordance with the X.509 standard, the first device may verify that the short-term identity indicated in the derived certificate is identical to an identity of the device from which the derived certificate was received. If the identities are identical, the first device may authenticate the device from which the derived certificate was received as the second device.

Thus, by having the devices issue their own self-signed root certificates and exchange them with one another in any trusted manner, mutual authentication of the devices can subsequently be achieved, even when the identities of the devices are changing. Importantly, this is accomplished without the involvement of an external certificate authority or any other third party. Rather, it is a peer-to-peer process.

It is possible that a given device may simultaneously have more than one short-term identity. For example, a device on a home network may acquire one network address for communication with other devices on the home network. However, the device may also communicate with devices outside the home network, for example on the Internet, via a router. Consequently, the device may acquire a network address of the router for communication with the devices on the Internet or on any other external network. The device may alternatively or additionally acquire an external address of a Traversal Using Relays around NAT (TURN) server, where NAT refers to Network Address Translator. A TURN server proxies traffic based on incoming connections and permits communication to a peer when behind a NAT that only allows outbound traffic. In the case that a device has more than one short-term identity, the device may create a separate derived certificate for each short-term identity, or the device may create a derived certificate for more than one short-term identity. The latter case is described with respect to FIG. 1.

FIG. 1 is a schematic diagram illustrating a first device 102 and a second device 104 in a home network 100, where the first device 102 is connected to a third device 106 on the Internet 108 via a router 110. The first device 102, the second device 104 and the third device 106 have issued to themselves the self-signed root certificates 112, 114 and 116, respectively. The first device 102 and the second device 104 may exchange their respective root certificates 112 and 114 in any trusted manner as denoted by arrow 118. Similarly, the first device 102 and the third device 106 may exchange their respective root certificates 112 and 116 in any trusted manner as denoted by arrow 120.

The first device 102 and the second device 104 are able to communicate with each other in an insecure manner as denoted by arrow 122. Within the home network 100, the first device 102 is dynamically assigned an IP address 192.168.0.103. Thus, when the second device 104, which is also in the home network 100, communicates with the first device 102, it detects the first device 102's address as 192.168.0.103. Detection of an IP address may occur through well-known technologies like multicast. In contrast, when the third device 106 communicates with the first device 102, it does so via the router 110, where the communication between the third device 106 and the router 110 is denoted by arrow 124 and the communication between the router 110 and the first device 102 is denoted by arrow 126. The router 110 has an IP address, namely 206.51.26.192, that is different from the IP address 192.168.0.103 assigned to the first device 102 within the home network 100. Because the third device 106 communicates with the first device 102 via the router 110, the third device 106 detects the first device 102's address as 206.51.26.192. It follows that the first device 102 has effectively acquired two short-term identities in the form of two different IP addresses: 192.168.0.103 and 206.51.26.192. The identities are considered short-term in that they may vary dynamically in response to changes in the home network 100 or changes in the first device 102 or both. For example, the short-term identities may be acquired when the first device roams onto the home network 100 and may be lost when the first device roams onto a different network.

The first device 102 may authenticate itself to the second device 104 and to the third device 106 using a single derived certificate 130 for the two short-term identities 132 of 192.168.0.103 and 206.51.26.192. Each of the second device 104 and the third device 106 may determine whether one of the short-term identities 132 is identical to the detected identity of the device from which it received the derived certificate 130.

Alternatively, although not shown in FIG. 1, the first device 102 may authenticate itself to the second device 104 using one derived certificate for the short-term identity 192.168.0.103, and may authenticate itself to the third device 106 using another derived certificate for the short-term identity 206.51.26.192.

Figure 2:
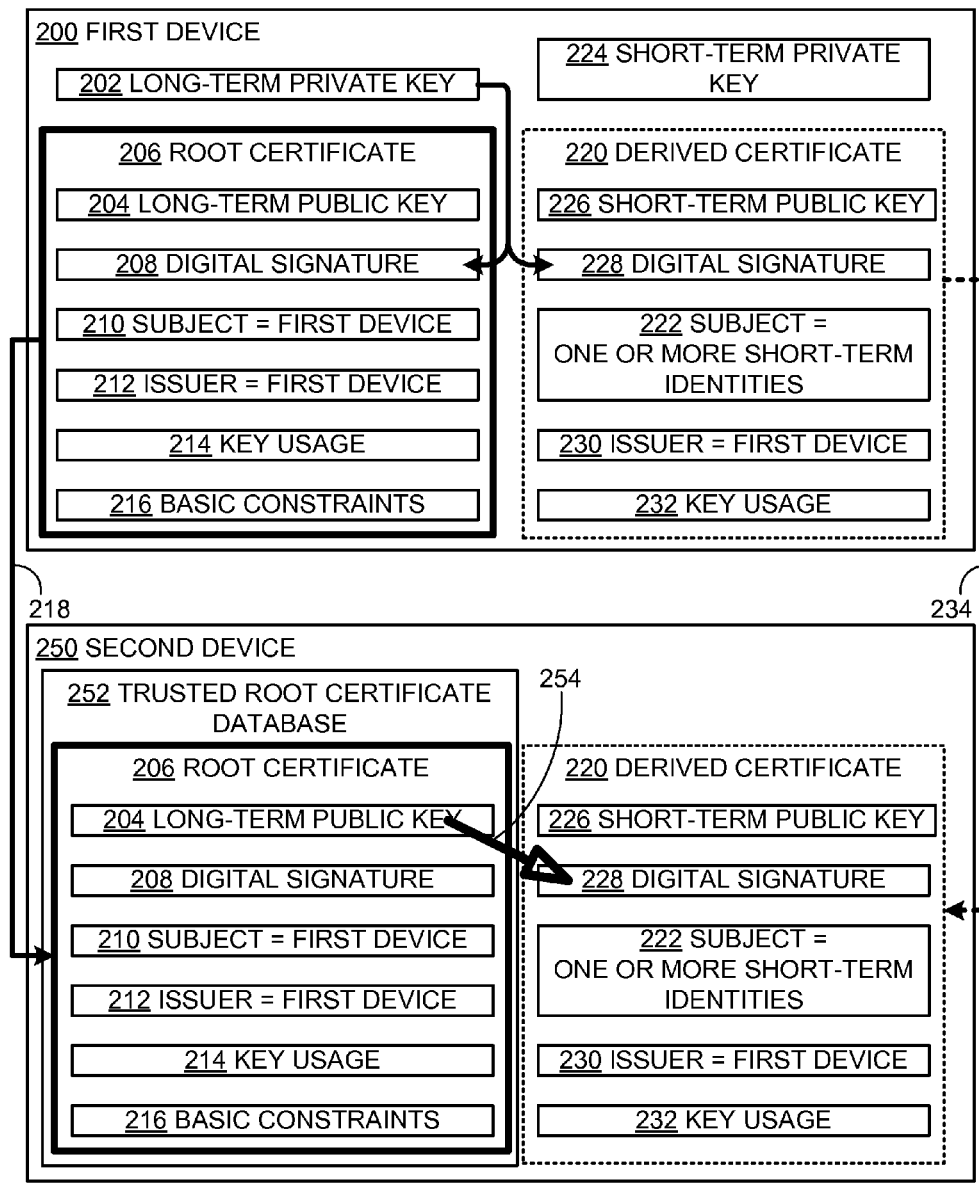
FIG. 2 is a schematic diagram illustrating an example procedure for a first device to authenticate itself to a second device.

FIG. 2 is a schematic diagram illustrating an example procedure for a first device 200 to authenticate itself to a second device 250. The first device 200 is an example of the first device 102, and the second device 250 is an example of the second device 104 or the third device 106.

Figure 3:
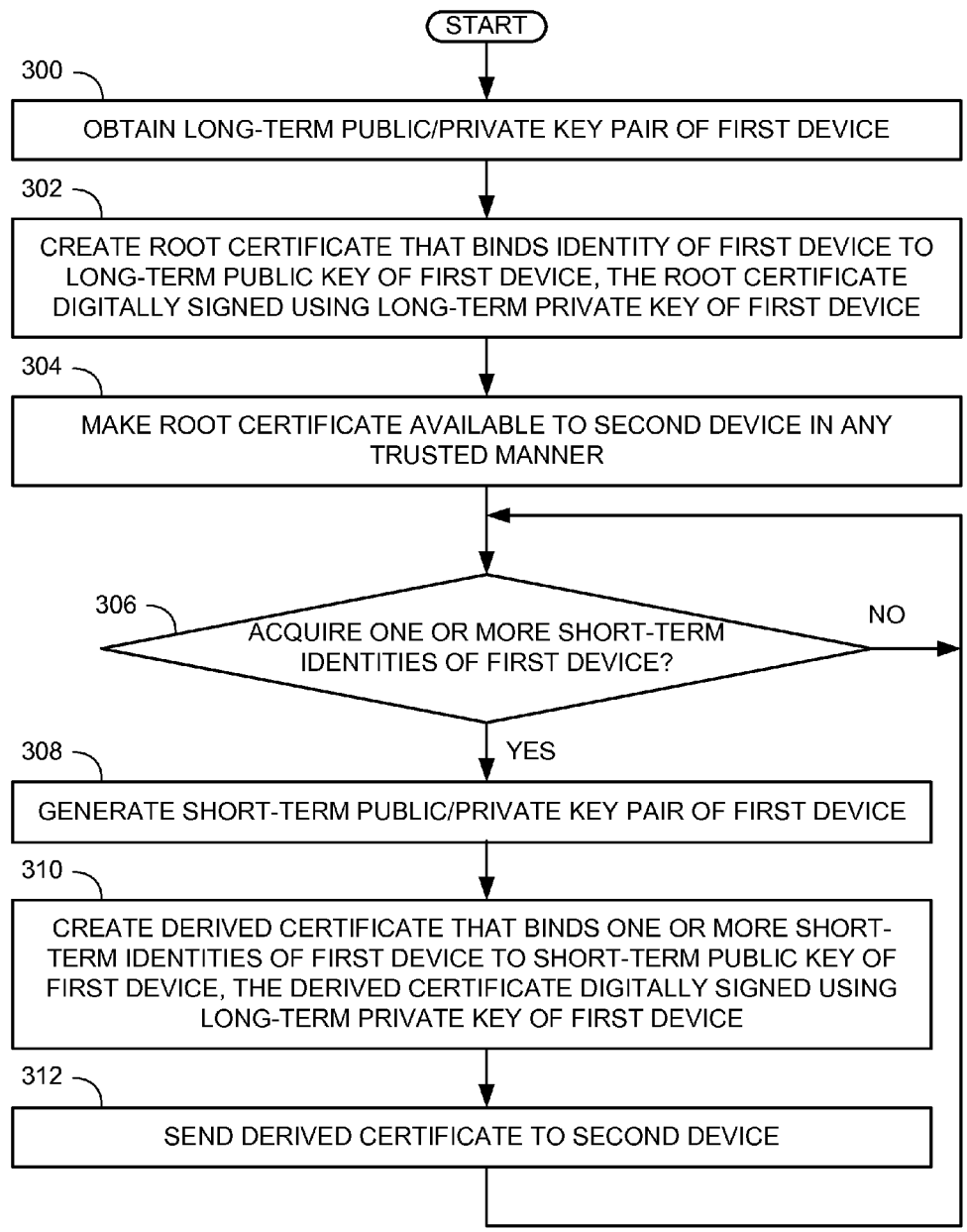
FIG. 3 is a flow diagram illustrating an example method in a first device for creating a derived certificate usable by a second device to authenticate the first device.

FIG. 3 is a flow diagram illustrating an example method in the first device 200 for creating a derived certificate usable by the second device 250 to authenticate the first device 200.

The method begins at 300 by having the first device 200 obtain a long-term public/private key pair consisting of a long-term private key 202 and a long-term public key 204. In one example, the first device 200 uses a random, pseudo-random or quasi-random number generator to generate the long-term private key 202, and then computes the long-term public key 204 as a function of the long-term private key 202. For example, the long-term private key 202 and the long-term public key 204 may be obtained using an Elliptic Curve Cryptography (ECC)—based protocol. In this case, the long-term private key 202 would be an integer randomly or pseudo-randomly selected within an interval $[1, n-1]$ and the long-term public key 204 would be determined from a scalar multiplication of the long-term private key 202 and a base point G on an elliptic curve E defined over a prime finite field $F_p$, that has order n or defined over the finite field $F_2m$, which is a binary representation with $2^m$ elements. While the point multiplication used to calculate the long-term public key 204 from the long-term private key 202 and the base point G is relatively straightforward, the inverse of this operation is extremely difficult. In general, ECC-based protocols rely on the difficulty of this operation.

In another example, a third party, such as a certificate authority, may be involved in having the first device 200 obtain the long-term public/private key pair, as is the case, for example, with implicit certificates.

At 302, the first device 200 creates for itself a self-signed root certificate 206 that binds an identity of the first device 200 to the long-term public key 204 that was obtained at 300. The root certificate 206 is digitally signed with a digital signature 208 using the long-term private key 202 that was obtained at 300. In one example, the digital signature 208 may be created by applying a Ron Rivest, Adi Shamir and Leonard Aldeman (RSA) algorithm to one or more elements of the root certificate 206 or to a hash thereof, and effectively using the long-term private key 202 as an encryption key. In another example, the digital signature 208 may be created by applying an Elliptic Curve Digital Signature Algorithm (ECDSA) algorithm to a hash of the root certificate 206.

In addition to fields for a public key and for a digital signature, an X.509 certificate comprises a number of other standard fields, including, for example, a field indicating the subject of the certificate and another field indicating the issuer of the certificate. In the case of the root certificate 206, a subject field 210 may indicate the first device 200 and an issuer field 212 may also indicate the first device 200. In general, when a certificate is self-signed, the subject of the certificate and the issuer of the certificate will be the same. In the case that the root certificate 206 is an X.509 certificate, it may alternatively or additionally comprise an indication of the first device 200 in a "subjectAltName" extension (not shown), as described previously.

The self-signed root certificate 206 includes an indication that it may be used for verifying digital signatures of derived certificates and optionally that it may be used for verifying digital signatures on certificate revocation lists. An X.509 certificate may also comprise extension fields indicative of how the certificate is to be used. For example, a certificate may comprise one or more key usage extension fields which define the purpose(s) of the certificate's public key, where each key usage is indicated by a bit. In this case, for the root certificate 206, the first device 200 may assert the "keyCertSign" bit in a key usage extension field 214 to indicate that the long-term public key 204 is permitted to be used for verifying a signature on a public key certificate. Assertion of the "keyCertSign" bit in the key usage extension field 214 will allow the root certificate 206 to be used by the second device 250 to verify a signature on a derived certificate received from the first device 200, as will be described below. The first device 200 may also optionally assert the "cRLsign" bit in the key usage extension field 214 to indicate that the long-term public key 204 is permitted to be used for verifying a signature on a certificate revocation list.

The root certificate 206 may also comprise a basic constraints extension field 216 which indicates whether the long-term public key 204 belongs to a certificate authority (CA). If the "keyCertSign" bit is asserted, then the X.509 standard requires that the "cA" bit in the basic constraints extension field 216 also be asserted. The root certificate 206 may comprise additional elements which, for clarity, are not shown in FIG. 2.

At any point after creating the root certificate 206, the first device 200 may provide the root certificate 206 to the second device 250 in any trusted manner, as indicated by arrow 218 in FIG. 2 and as indicated at 304 in FIG. 3. In one example, the first device 200 may provide the root certificate 206 to the second device 250 using a universal serial bus (USB) connection. In another example, the root certificate 206 may be imported from the first device 200 by the second device 250 over an insecure wireless local area network connection, such as an insecure Wi-Fi® connection, and a user of the first device 200 and of the second device 250 could manually (for example, visually) compare the root certificate 206 on the first device 200 to the root certificate imported by the second device 250 to ensure that the root certificates are identical, thereby verifying the authenticity of the root certificate using an out-of-band means. In yet another example, the first device 200 may provide the root certificate 206 to the second device 250 over a secure wireless personal area network connection, such as a Bluetooth® connection, established between the first device 200 and the second device 250. There may be other suitable methods of making the root certificate of the first device 200 available to the second device 250 in a trusted manner.

Once the root certificate 206 of the first device 200 has been received by the second device 250 in any trusted manner, the second device 250 may store the root certificate 206 in a trusted root certificate database 252. A trusted root certificate database is generally implemented in a file system that has restricted privileges. In one example, the trusted root certificate database 252 comprises a directory containing certificates in the Distinguished Encoding Rules (DER) format. When the first device 200 seeks to determine if a received certificate is trusted, it may examine the files in the directory to determine if there is a trusted root certificate that is identical to the received certificate. The trusted root certificate database 252 may store additional trusted root certificates (not shown), each one received in any trusted manner from one or more devices.

At 306, the first device 200 may determine whether it has acquired one or more short-term identities. For example, as described previously, at any point in time the first device 200 may be assigned one or more identities, including IP addresses, MAC addresses, Bluetooth® addresses, PINs and the like. In one example, the first device 200 may determine that it has acquired a short-term identity, such as a network IP address or a PIN, from an event generated by its operating system. In another example, the first device 200 may determine that it has acquired a short-term identity, such as a public IP address, from the Internet Gateway Device Protocol (IGDP) of a home based router. Alternatively, a TURN server may be used to determine a public IP address of the first device 200 and an IP address to contact the first device 200 to traverse NATs. If the first device 200 determines at 306 that no short-term identities have been acquired, the first device 200 may continue to check for the acquisition of one or more short-term identities at 306. If the first device 200 determines at 306 that it has acquired one or more short-term identities, for example, one or more new network addresses, the first device 200 may proceed to generate a short-term public/private key pair consisting of a short-term private key 224 and a short-term public key 226, as shown at 308. This may be done, for example, using a random, pseudo-random or quasi-random number generator to generate the short-term private key 224, and then computing the short-term public key 226 as a function of the short-term private key 224. For example, the short-term private key 224 and the short-term public key 226 may be obtained using an ECC-based protocol as described previously.

At 310, the first device 200 creates a derived certificate 220 for at least one of the one or more short-term identities acquired at 306. The derived certificate 220 binds the one or more short-term identities to the short-term public key 226 that was generated at 308. The derived certificate 220 is digitally signed with a digital signature 228 using the long-term private key 202 that was obtained at 300. The digital signature 228 may be created, for example, by using the long-term private key 202 as an encryption key in an RSA algorithm that is applied to one or more elements of the derived certificate 220 or of a hash thereof. In another example, the digital signature 228 may be created by applying an ECDSA algorithm to a hash of the derived certificate 220.

In accordance with the X.509 standard, the derived certificate 220 indicates in its subject field 222 at least one of the one or more short-term identities that the first device 200 currently possesses. Alternatively or additionally, at least one of the one or more short-term identities that the first device 200 currently possesses may be indicated in a subjectAltName extension (not shown), as described previously. Also in accordance with the X.509 standard, the derived certificate 220 indicates in its issuer field 230 that the issuer of the derived certificate 220 is the first device 200.

The derived certificate 220 includes an indication that it may be used for authentication. For example, in the case of an X.509 certificate, the first device 200 may assert the "digitalSignature" bit in a key usage extension field 232 of the derived certificate 220 to indicate that the derived certificate 220 is permitted to be used for authentication. In the case that the derived certificate 220 has been digitally signed using an ECDSA signature scheme, the TLS/SSL protocol is likely to negotiate a session key using a key agreement protocol such as Elliptic Curve Diffie-Hellman (ECDH), and therefore the first device 200 may assert the "keyAgreement" bit in the key usage extension field 232 to indicate that the public key in the derived certificate 220 can be used in a key agreement protocol. In the case that the derived certificate 220 has been digitally signed using an RSA algorithm, the TLS/SSL protocol is likely to negotiate a session key by having the first device 200 generate a session key and encrypt the session key with the public key in the derived certificate 220, and therefore the first device 200 may assert the "dataEncipherment" bit in the key usage extension field 232.

The derived certificate 220 may comprise additional elements which, for clarity, are not shown in FIG. 2.

If the first device 200 seeks to authenticate itself to the second device 250, the first device 200 may provide the derived certificate 220 to the second device 250, as indicated by arrow 234 in FIG. 2 and as shown at 312 in FIG. 3. In one example, the derived certificate 220 may be passed from the first device 200 to the second device 250 as part of a TLS/SSL handshake sequence, such as that which happens when entering any https website. Because the second device 250 is already in possession of the trusted root certificate 206 of the first device 200, the second device 250 may use the root certificate 206 to verify the digital signature 228 of the derived certificate 220 and to authenticate the first device 200. This will be described further with respect to FIG. 4.

After providing the derived certificate 220 to the second device 250, the first device 200 may proceed to determine whether it has acquired one or more new short-term identities at 306. For the one or more new short-term identities acquired at 306, the first device 200 may generate a new short-term public/private key pair at 308 and may create a new derived certificate at 310 which it may send to the second device 250 at 312. However, it is not necessary for a new short-term public/private key pair to be generated whenever a new short-term identity is acquired. Alternatively (not shown), the first device 200 may use a previously generated short-term public/private key pair to create a new derived certificate. In one example, a new short-term public/private key pair may be generated for every Nth derived certificate that is created, where N=5, for example.

Although not explicitly shown in FIG. 3, in one example, the first device 200 may send the derived certificate 220 to the second device 250 in response to a request from the second device 250 for the first device 200 to authenticate itself to the second device 250. For example, the first device 200 may create a derived certificate 220 each time it acquires one or more new short-term identities at 306, but may only send the derived certificate 220 to the second device 250 in response to a request from the second device 250.

In another example not shown in FIG. 3, the first device 200 may only generate a short-term public/private key pair as described with respect to 308, create the derived certificate 220 as described with respect to 310 and send the derived certificate 220 to the second device 250 as described with respect to 312 in response to a request from the second device 250 for the first device 200 to authenticate itself.

Figure 4:
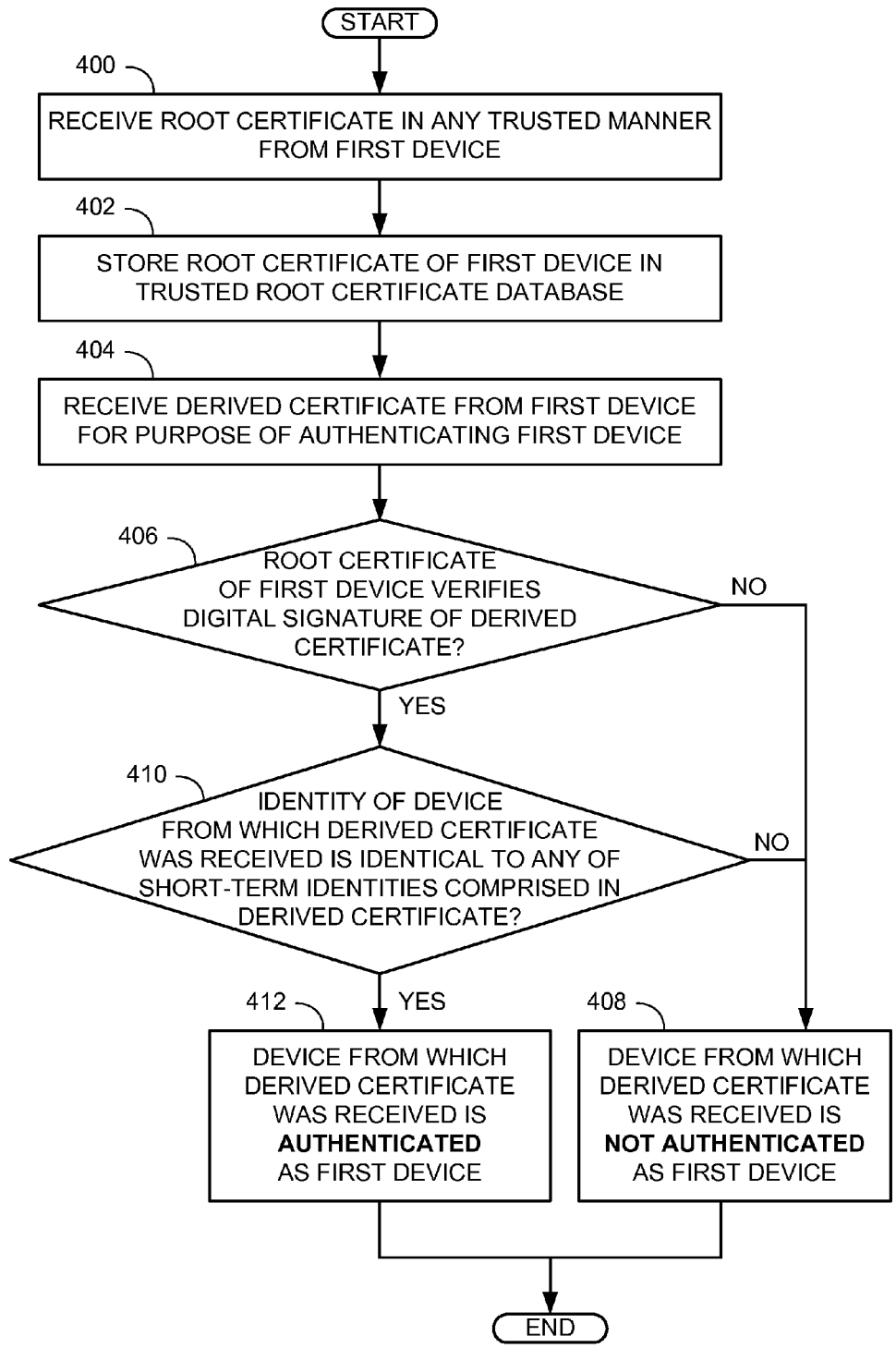
FIG. 4 is a flow diagram illustrating an example method in a second device for using a derived certificate of a first device to authenticate the first device.

FIG. 4 is a flow diagram illustrating an example method in a second device 250 for using a derived certificate of a first device 200 to authenticate the first device 200.

The method begins at 400 by having the second device 250 receive the root certificate 206 of the first device 200 in the trusted manner described with respect to FIG. 3.

At 402, the second device 250 stores the root certificate 206 of the first device 200 in its trusted root certificate database 252.

At some point after storing the root certificate 206 of the first device 200, as shown at 402, the second device 250 may receive a certificate 220, as shown at 404. Although not shown in FIG. 4, the received certificate 220 may be received in response to the second device 250 sending a request to the first device 200 for the first device 200 to authenticate itself to the second device 250. The received certificate 220 binds one or more identities of the first device 200 to a public key 226 and is digitally signed with a digital signature 228.

Upon receipt of the certificate 220, as shown at 404, the second device 250 may proceed to use the received certificate 220 in an attempt to authenticate the first device 200 from which the certificate 220 was received.

At 406, the second device 250 may determine whether the root certificate 206 of the first device 200 verifies a digital signature of the received certificate 220. More specifically, the second device 250 may determine from the issuer field 230 that the issuer of the received certificate 220 is the first device 200. The second device 250 may proceed to locate a root certificate in the trusted root certificate database 252 that stores an identifier of the first device 200 in its subject field. In this simple example, the second device 250 determines that the subject field 210 of the root certificate 206 stores an identifier of the first device 200. Since the issuer indicated in the issuer field 230 of the received certificate 220 is identical to the subject indicated in the subject field 210 of the root certificate 206 (namely, the first device 200), the second device 250 may proceed to use the long-term public key 204 of the root certificate 206 to verify the digital signature 228 of the certificate 220 that was received at 404, as indicated by arrow 254 in FIG. 2. The second device 250 may verify the digital signature 228 using the long-term public key 204 in the root certificate 206.

Although not explicitly shown in FIG. 4, in accordance with the requirements of the X.509 standard, the second device 250 may check that the long-term public key 204 of the root certificate 206 is permitted to be used for verifying the digital signature 228. For example, the second device 250 may check that the key usage extension field 214 of the root certificate 206 includes an asserted "keyCertSign" bit. In addition, the second device 250 may check that the basic constraints extension field 216 of the root certificate 206 includes an asserted "cA" bit.

Also, although not explicitly shown in FIG. 4, the second device 250 may check that short-term public key 226 of the derived certificate 220 is permitted to be used for authentication. For example, the second device 250 may check that the key usage extension field 232 of the derived certificate 220 includes an asserted "digitalSignature" bit. Depending on how the TLS/SSL is to negotiate a session key, the second device 250 may also check that the key usage extension field 232 of the derived certificate 220 includes an asserted "key-Agreement" bit (where the derived certificate 220 has been digitally signed using an ECDSA signature scheme) or an asserted "dataEncipherment" bit (where the derived certificate has been digitally signed using an RSA algorithm).

If the second device 250 determines at 406 that the root certificate 206 of the first device 200 does not verify a digital signature of the certificate received at 404, the second device 250 may determine at 408 that the device from which the received certificate was received is not authenticated as the first device 200 and the method may end. However, if the second device 250 determines at 406 that the root certificate 206 of the first device 200 verifies the digital signature 228 of the certificate 220 that was received at 404, the second device 250 may proceed, in accordance with the requirements of the X.509 standard, to check at 410 that any of the one or more short-term identities indicated in the subject field 222 of the received certificate 220 is identical to the identity of the device from which the certificate 220 was received. The device 250 is able to determine the identity of the device from which the certificate 220 was received because the certificate 220 is communicated in the SSL/TLS channel.

If it is determined at 410 that the identity of the device 200 from which the certificate 220 was received is not identical to any of the one or more short-term identities indicated in the subject field 222 of the received certificate 220, the second device 250 may determine at 408 that the device from which the certificate 220 was received is not authenticated as the first device 200 and the method may end. However, if it is determined at 410 that the identity of the device from which the certificate 220 was received is identical to any of the one or more short-term identities comprised in the subject field 222 of the received certificate 220, the second device 250 may determine at 412 that the device from which the certificate 220 was received is authenticated as the first device 200. In other words, the second device 250 may determine that the received certificate 220 is an authentic derived certificate 220 of the first device 200.

The determination at 406 as to whether the root certificate 206 of the first device 200 verifies the digital signature 228 of the received certificate 220 and the determination at 410 as to whether an identity of the device from the which the received certificate was received is identical to any of one or more short-term identities stored in the subject field 222 of the received certificate 220 may be performed in a different order than that illustrated in FIG. 4. Although not explicitly shown, additional actions may be performed by the second device 250 prior to making a determination whether the device from which the certificate 220 was received is authenticated as the first device 200.

Once the second device 250 has successfully authenticated the first device 200, the second device 200 may proceed to use the authenticated derived certificate 220 to communicate with the first device 200 in a secure and trusted manner. For example, the second device 250 may use the short-term public key 226 from the authenticated derived certificate 220 to encrypt data to be sent to the first device 200. The second device 250 is assured that the short-term public key 226 in the authenticated derived certificate 220 truly belongs to the first device 200 and therefore that the message can only be decrypted by the short-term private key 224 of the first device 200.

The methods illustrated in FIG. 3 and FIG. 4 may be combined to achieve mutual authentication of the first device 200 and the second device 250. For example, in addition to having the first device 200 provide its root certificate 206 to the second device 250 in any trusted manner and sending a derived certificate 220 to the second device 250, the first device 200 may also receive a root certificate (not shown) of the second device 250 in any trusted manner and may receive a derived certificate (not shown) of the second device 250, which the first device 200 may use to authenticate the second device 250. Once mutual authentication has been achieved, the first device 200 and the second device 250 may be able to establish a secure connection. In one example, the first device 200 and the second device 250 may use one another's short-term public keys in a key agreement protocol, such as a Diffie-Hellman protocol, to establish a shared secret that can be used for symmetric encryption. In another example, the first device 200 and the second device 250 can begin to establish a session key for the TLS/SSL session as part of the TLS/SSL handshake protocol. Again, it is noted that this is accomplished without the involvement of an external certificate authority or any other third party. Rather, it is a peer-to-peer process.

Figure 5:
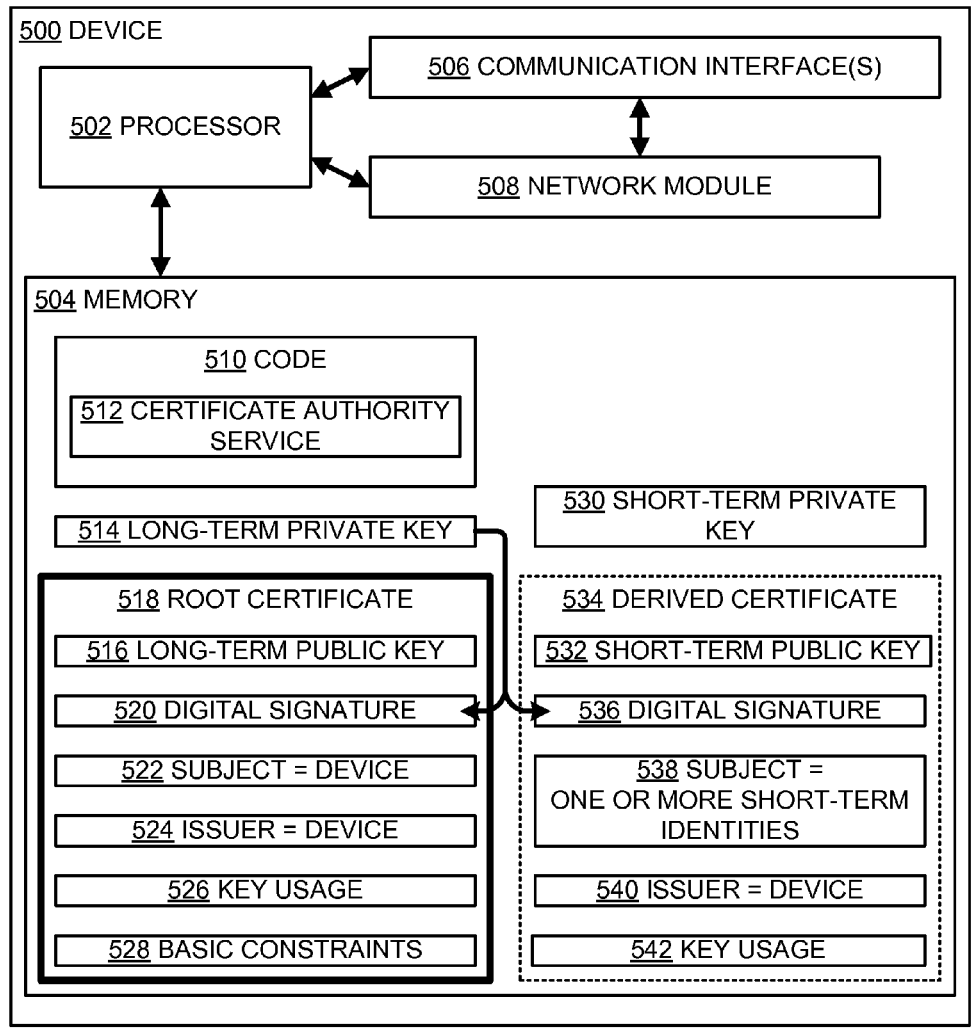
FIG. 5 is a block diagram of an example first device.

FIG. 5 is a block diagram of an example first device 500. The first device 500 may contain other elements which, for clarity, are not shown in FIG. 5.

The first device 500 is an example of any one of the devices 102, 104, 106, and 200. The first device 500 comprises a processor 502 which is coupled to a memory 504 and to one or more communication interfaces 506 through which it is operable to communicate with one or more other devices.

The communication interfaces 506 may comprise one or more wired communication interfaces, wireless communication interfaces or both. For example, the one or more communication interfaces 506 may comprise any of a Universal Serial Bus (USB) interface, an Ethernet interface, an Integrated Services Digital Network (ISDN) interface, a Digital Subscriber Line (DSL) interface, a Local Area Network (LAN) interface, a High-Definition Multimedia (HDMI) interface, a Digital Visual Interface (DVI), or an Institute of Electrical and Electronics Engineers (IEEE) 1394 interface such as an i.LINK™, Lynx$^{SM}$ or Firewire® interface. Alternatively or additionally, the one or more communication interfaces 506 may comprise any of a Wireless Local Area Network (WLAN) interface, a short-range wireless communication interface such as a Wireless Personal Area Network (WPAN) interface, a Wireless Wide Area Network (WWAN) interface, or a Wireless Metropolitan Area Network (WMAN) interface.

The first device 500 also comprises a network module 508 coupled to the processor 502, and to the one or more communication interfaces 506. The network module 508 is operable to acquire one or more short-term identities of the first device 500. For example, the network module 508 may acquire via any one of the one or more communication interfaces 506 one or more short-term IP addresses assigned to the first device 500 by a DHCP server in a network.

The memory 504 is operable to store code 510 that, when executed by the processor 502, results in the example method illustrated in FIG. 3. The code 510 may comprise a certificate authority service 512 that is configured to obtain a long-term public/private key pair consisting of a long-term private key 514 and a long-term public key 516. While the certificate authority server 512 is primarily software, it may use one or more hardware modules (not shown) for improved speed. The certificate authority service 512 is configured to create a self-signed root certificate 518 that binds an identity of the first device 500 to the long-term public key 516. The root certificate 518 is digitally signed with a digital signature 520 using the long-term private key 514. The root certificate 518 includes a subject field 522 indicating the first device 500, and an issuer field 524 indicating the first device 500. Alternatively or additionally to the first device 500 being indicated in the subject field 522, the root certificate 518 may comprise an indication of the first device 500 in a subjectAltName extension (not shown), as described previously. The self-signed root certificate 518 includes an indication that it may be used for verifying digital signatures of derived certificates. The root certificate also optionally includes an indication that it may be used for verifying digital signatures on certificate revocation lists. According to the X.509 standard, the certificate authority service 512 may be configured to assert a "keyCertSign" bit and optionally a "cRLsign" bit in a key usage extension field 526 of the root certificate 518 and to assert a "cA" bit in a basic constraints extension field 528 of the root certificate 518. The memory 504 is operable to store the long-term private key 514 and the root certificate 518.

The certificate authority service 512 is configured to generate a short-term public/private key pair consisting of a short-term private key 530 and a short-term public key 532. The certificate authority service 512 is configured to create a derived certificate 534 that binds one or more short-term identities acquired by the network module 508 via any one of the one or more communication interfaces 506 to the short-term public key 532. The derived certificate 534 is digitally signed with a digital signature 536 using the long-term private key 514. A subject field 538 of the derived certificate 534 indicates the one or more short-term identities. Alternatively or additionally, at least one of the one or more short-term identities may be indicated in a "subjectAltName" extension (not shown) of the derived certificate 534, as described previously. An issuer field 540 of the derived certificate 534 indicates an identity of the first device 500.

The derived certificate 534 includes an indication that it may be used for authentication. For example, according to the X.509 standard, the certificate authority service 512 may be configured to assert a "digitalSignature" bit in a key usage extension field 542 of the derived certificate 534. In the case that the derived certificate 534 has been digitally signed using an ECDSA signature scheme, the TLS/SSL protocol is likely to negotiate a session key using a key agreement protocol such as ECDH, and therefore the certificate authority service 512 may be configured to assert a "keyAgreement" bit in the key usage extension field 542 to indicate that the short-term public key 532 in the derived certificate 534 can be used in a key agreement protocol. In the case that the derived certificate 534 has been digitally signed using an RSA algorithm, the TLS/SSL protocol is likely to negotiate a session key by having the first device 500 generate a session key and encrypt the session key with the short-term public key 532 in the derived certificate 534, and therefore the certificate authority service 512 may be configured to assert the "dataEncipherment" bit in the key usage extension field 542.

The memory 504 is operable to store the short-term private key 530 and the derived certificate 534. Although not shown in FIG. 5, the memory 504 may be operable to store other derived certificates corresponding to one or more other short-term identities acquired by the network module 508 via any one of the one or more communication interfaces 506. Also, although not explicitly shown, the short-term private key 530 and the derived certificate 534 may overwrite a previously generated short-term private key and a previously created derived certificate, respectively.

The first device 500 is configured to send the root certificate 518 to one or more other devices in any trusted manner via any one of the one or more communication interfaces 506. The first device 500 is also configured to send the derived certificate 534 to one or more other devices via any one of the one or more communication interfaces 506. The root certificate 518 and the derived certificate 534 may be sent via the same one of the one or more communication interfaces 506, or, in the case that there is more than one communication interface 506, the root certificate 518 and the derived certificate 534 may be sent via different communication interfaces 506.

The memory 504 may also be operable to store applications (not shown) installable in the first device 500 that are executable by the processor 502. Examples of such applications include data communication applications, voice communication applications, messaging applications, games, calculators, and the like.

Figure 6:
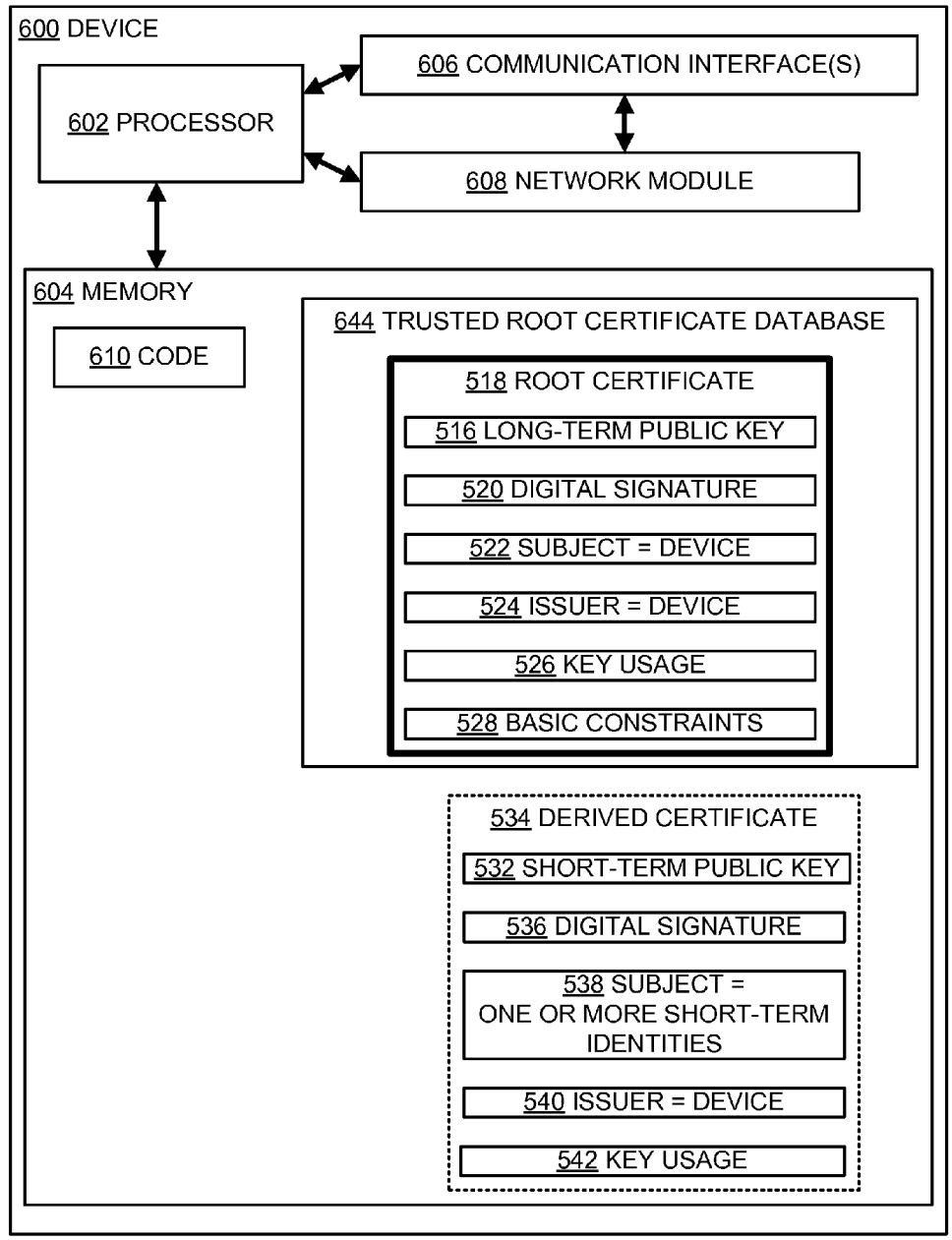
FIG. 6 is a block diagram of an example second device.

FIG. 6 is a block diagram of an example second device 600. The second device 600 may contain other elements which, for clarity, are not shown in FIG. 6.

The second device 600 is an example of any one of the devices 102, 104, 106, and 250. The second device 600 comprises a processor 602 which is coupled to a memory 604 and to one or more communication interfaces 606 through which it is operable to communicate with one or more other devices.

The communication interfaces 606 may comprise one or more wired communication interfaces, wireless communication interfaces or both. For example, the one or more communication interfaces 606 may comprise any of a Universal Serial Bus (USB) interface, an Ethernet interface, an Integrated Services Digital Network (ISDN) interface, a Digital Subscriber Line (DSL) interface, a Local Area Network (LAN) interface, a High-Definition Multimedia (HDMI) interface, a Digital Visual Interface (DVI), or an Institute of Electrical and Electronics Engineers (IEEE) 1394 interface such as an i.LINK™, Lynx$^{SM}$ or Firewire® interface. Alternatively or additionally, the one or more communication interfaces 606 may comprise any of a Wireless Local Area Network (WLAN) interface, a short-range wireless communication interface such as a Wireless Personal Area Network (WPAN) interface, a Wireless Wide Area Network (WWAN) interface, or a Wireless Metropolitan Area Network (WMAN) interface.

The second device 600 also comprises a network module 608 coupled to the processor 602, and to the one or more communication interfaces 606. The network module 608 is operable to acquire one or more short-term identities of the second device 600. For example, the network module 608 may acquire via any one of the one or more communication interfaces 606 one or more short-term IP addresses assigned to the second device 600 by a DHCP server in a network.

The memory 604 is operable to store code 610 that, when executed by the processor 602, results in the example method illustrated in FIG. 4.

The second device 600 is configured to receive the root certificate 518 in any trusted manner via any one of the one or more communication interfaces 606. The second device 600 is also configured to receive the derived certificate 534 via any one of the one or more communication interfaces 606. The root certificate 518 and the derived certificate 534 may be received via the same one of the one or more communication interfaces 606, or, in the case that there is more than one communication interface 606, the root certificate 518 and the derived certificate 534 may be received via different communication interfaces 506.

The memory 604 is operable to store a trusted root certificate database 644 comprising one or more trusted root certificates received from one or more other devices via one or more of the one or more communication interfaces 606. As described previously, the trusted root certificate database 644 may be implemented in a file system that has restricted privileges. For example, the trusted root certificate database 644 may comprise a directory containing certificates in the DER format. It may possible to prevent tampering of the trusted root certificate database 644 via user permissions on the file system.

The memory 604 may also be operable to store applications (not shown) installable in the second device 600 that are executable by the processor 602. Examples of such applications include data communication applications, voice communication applications, messaging applications, games, calculators, and the like.

As noted above, by having the devices issue their own self-signed root certificates and exchange them with one another in any trusted manner, mutual authentication of the devices can subsequently be achieved, even when the identities of the devices are changing. Importantly, this is accomplished without the involvement of an external certificate authority or any other third party. Rather, it is a peer-to-peer process. To that end, the memory 504 of first device 500 may be operable to store a trusted root certificate database (not shown) comprising one or more trusted root certificate received from one or more other devices via one or more of the one or more communication interfaces 506, and the code 510, when executed by the processor 502, may result in the example method illustrated in FIG. 4, with the first device 500 in the role of the "second device". Further to that end, the code 610 may comprise a certificate authority service (not shown) analogous to certificate authority service 512. While that certificate authority server is primarily software, it may use one or more hardware modules (not shown) for improved speed. The memory 604 may be operable to store a long-term private key (not shown) obtained by the second device 600, the short-term private key (not shown) generated by its certificate authority service and the derived certificate (not shown) generated by its certificate authority service. Further, code 610 may be operable to send the root certificate (not shown) generated by its certificate authority service to one or more other devices in any trusted manner via any one of the one or more communication interfaces 606 and to send the derived certificate generated by its certificate authority service to one or more other devices via any one of the one or more communication interfaces 606. The root certificate and the derived certificate may be sent via the same one of the one or more communication interfaces 606, or, in the case that there is more than one communication interface 606, the root certificate and the derived certificate may be sent via different communication interfaces 606.

APPENDIX A

APPENDIX A is an example root certificate.
Version: V3
Serial number: 00 ef 1f e1 98 d5 2e eb 95 56 aa 1a 25 69 d5 7f 39
Signature algorithm: sha1 RSA
Signature hash algorithm: sha1
Issuer: CN=My BlackBerry (RSA)
Valid from: August-16-11 10:00:30 AM
Valid to: October-05-43 10:10:00 PM
Subject: CN=My BlackBerry (RSA)
Public key: RSA (1024 Bits) 30 81 89 02 81 81 00 d9 0c 03 2b d4 d0 92 30 2c 46 a3 20 df 4d ac f2 2a f0 5f 98 51 26 cc b6 79 0e f7 66 a9 cf 3e 81 f2 e9 6d db c0 6c 53 a7 aa b2 4b 9a 64 54 ca 13 d7 b6 b9 4e 72 f5 24 04 f9 0e c5 d6 b7 0f ed b1 88 51 f4 75 43 4a cf 9e 05 32 4f 19 3b 02 07 90 d1 75 77 a1 3e 21 5d f1 30 b3 6b df f1 d2 fe 39 8a 04 50 18 4a 76 db dd 27 cc b7 98 86 c0 a6 3f b8 41 9f 02 4f f6 2f 46 84 1c 5a 7c c5 8f 76 99 02 03 01 00 01
Subject Key Identifier: 87 e3 80 d3 79 b9 89 d3 e7 6e 7a 9e 21 9e c9 a9 1e fc 78 b4
Key Usage: Digital Signature, Key Encipherment, Certificate Signing (a4 00)
Basic Constraints: Subject Type=CA, Path Length Constraint=0
Thumbprint algorithm: sha1
Thumbprint: 55 9e 12 32 b9 fe 8a 1b cd f3 f5 53 65 04 64 4f 5f 4c a3 b6

APPENDIX B

APPENDIX B is an example derived certificate.
Version: V3
Serial number: 00 a8 87 9e e7 f8 dc aa aa a5 6d 42 81 18 c5 4f 6d
Signature algorithm: sha1 RSA
Signature hash algorithm: sha1
Issuer: CN=My BlackBerry (RSA)
Valid from: August-16-11 10:00:30 AM
Valid to: October 05-43 10:10:00 PM
Subject: CN=192.168.0.116
Public key: RSA (1024 Bits) 30 81 89 02 81 81 00 9d 5f a2 10 09 ec 05 25 e3 14 e3 a1 56 7d c5 28 c4 a9 9e 88 2e 7d 3e 18 b4 9c be fc 96 48 51 44 ae 68 75 07 2b b9 90 ba 59 c9 85 cc 54 d6 74 f2 d2 38 d8 3b cd f2 d0 47 28 b9 31 e4 d0 e3 6e 1f 02 aa 13 a2 e5 6d 23 2d 01 9c 85 82 f2 07 fe f6 28 56 9e b0 48 71 a1 b3 6e 52 29 00 f6 3f bc b2 d3 d0 15 29 d1 50 c4 23 a5 e8 ab 7a de c2 49 55 a7 ff 4e 62 99 30 c4 a7 6b 98 e9 38 ff 22 8f 03 02 03 01 00 01
Authority Key Identifier: KeyID=87 e3 80 d3 79 b9 89 d3 e7 6e 7a 9e 21 9e c9 a9 1e fc 78 b4
Key Usage: Digital Signature, Key Encipherment (a0 00)
Basic Constraints: Subject Type=End Entity, Path Length Constraint=None
Thumbprint algorithm: sha1
Thumbprint: of c7 6a 73 de ea b2 78 d4 92 18 09 ce d3 06 c5 86 57 73 2b

What is claimed is:

1. A method to be performed by a first device, the method comprising:
   creating for the first device a root certificate that binds an identity of the first device to a long-term public key of the first device and that indicates that the root certificate is to be used for verifying digital signatures of derived certificates, the root certificate digitally signed using a long-term private key of the first device;
   making the root certificate available to a second device in any trusted manner;
   acquiring one or more short-term identities of the first device, wherein the one or more short-term identities comprise one or more network addresses;
   generating a short-term public/private key pair consisting of a short-term public key of the first device and a short-term private key of the first device;
   creating for the first device a derived certificate that binds at least one of the one or more short-term identities of the first device to the short-term public key of the first device, the derived certificate digitally signed using the long-term private key of the first device; and
   sending the derived certificate to the second device,
   wherein the long-term public key of the first device and the long-term private key of the first device form a long-term public/private key pair of the first device.

2. The method as claimed in claim 1, further comprising:
   acquiring one or more new short-term identities of the first device;
   generating a new short-term public/private key pair consisting of a new short-term public key of the first device and a new short-term private key of the first device;
   creating for the first device a new derived certificate that binds at least one of the one or more new short-term identities of the first device to the new short-term public key of the first device, the new derived certificate digitally signed using the long-term private key of the first device; and
   sending the new derived certificate to the second device.

3. The method as claimed in claim 1, further comprising:
   receiving in any trusted manner a root certificate of the second device; and storing the root certificate of the second device,
   wherein the root certificate of the second device binds an identity of the second device to a long-term public key of the second device, the root certificate of the second device digitally signed using a long-term private key of the second device, and
   wherein the long-term public key of the second device and the long-term private key of the second device form a long-term public/private key pair of the second device.

4. The method as claimed in claim 3, wherein the root certificate of the second device includes an indication that the root certificate of the second device is to be used for verifying digital signatures of derived certificates.

5. The method as claimed in claim 3, further comprising:
   receiving a derived certificate that binds one or more identities of the second device to a public key and that indicates that the received derived certificate was issued by the second device, wherein the derived certificate is digitally signed.

6. The method as claimed in claim 5, further comprising:
   verifying a digital signature of the received derived certificate using the long-term public key of the root certificate of the second device.

7. The method as claimed in claim 6, further comprising:
   verifying that one of the one or more identities indicated in a subject field of the received derived certificate is identical to an identity of a device from which the received derived certificate was received.

8. The method as claimed in claim 7, further comprising:
   determining that the device from which the received derived certificate was received is authenticated as the second device.

9. The method as claimed in claim 8, further comprising:
   establishing a secure connection with the second device.

10. The method as claimed in claim 1, wherein the one or more network addresses comprise one or more Internet protocol (IP) addresses.

11. A first device comprising:
    a processor;
    a memory coupled to the processor;
    one or more communication interfaces coupled to the processor; and
    a network module coupled to the processor and to the one or more communication interfaces, wherein the network module is operable to acquire one or more short-term identities via one of the one or more communication interfaces, wherein the one or more short-term identities comprise one or more network addresses,
    wherein the memory is configured to store a certificate authority service which, when executed by the processor, is configured to:
    create for the first device a root certificate that binds an identity of the first device to a long-term public key of the first device, and that indicates that the root certificate is to be used for verifying digital signatures of derived certificates, wherein the root certificate is digitally signed using a long-term private key of the first device;
    generate a short-term public/private key pair consisting of a short-term public key of the first device and a short-term private key of the first device;
    create for the first device a derived certificate that binds at least one of the one or more short-term identities of the first device to the short-term public key of the first device, wherein the derived certificate is digitally signed using the long-term private key of the first device; and wherein the first device is configured to make the root certificate available to a second device in any trusted manner via any one of the one or more communication interfaces and the first device is configured to send the derived certificate to the second device via any one of the one or more communication interfaces.

12. The first device as claimed in claim 11, wherein the certificate authority service, when executed by the processor, is further configured to:

indicate in the root certificate that the root certificate is to be used for verifying digital signatures of derived certificates.

13. The first device as claimed in claim 11, the first device further configured to receive in any trusted manner via any one of the one or more communication interfaces a root certificate of the second device to be stored in the memory, the root certificate of the second device binding an identity of the second device to a long-term public key of the second device, wherein the root certificate of the second device is digitally signed using a long-term private key of the second device, and wherein the long-term public key of the second device and the long-term private key of the second device form a long-term public/private key pair of the second device.

14. The first device as claimed in claim 13, the first device further configured to receive via one of the one or more communication interfaces a derived certificate that binds one or more identities of the second device to a public key and that indicates that the received derived certificate was issued by the second device, wherein the received derived certificate is digitally signed, and wherein the certificate authority service, when executed by the processor, is further configured to use the received derived certificate and the root certificate of the second device to determine the authenticity of a device from which the received derived certificate was received.

15. A second device comprising:

one or more communication interfaces through which the second device is configured to receive in any trusted manner a root certificate of a first device and through which the second device is configured to receive a derived certificate, wherein the root certificate of the first device binds an identity of the first device to a long-term public key of the first device, wherein the root certificate of the first device is digitally signed using a long-term private key of the first device, wherein the long-term public key of the first device and the long-term private key of the first device form a long-term public/private key pair of the first device, wherein the derived certificate binds one or more short-term identities of the first device to another public key and indicates that the root certificate is to be used for verifying digital signatures of derived certificates and indicates that the derived certificate was issued by the first device, and wherein the derived certificate is digitally signed;

a processor coupled to the one or more communication interfaces;

a memory coupled to the processor, the memory operable to store the root certificate of the first device, and the memory operable to store code which, when executed by the processor, is configured to use the long-term public key of the root certificate of the first device to verify a digital signature of the derived certificate, wherein the one or more short-term identities comprise one or more network addresses.

16. The second device as claimed in claim 15, wherein the code, when executed by the processor, is further configured to determine whether any of the one or more short-term identities indicated in a subject field of the derived certificate is identical to an identity of a device from which the derived certificate was received.

* * * * *